United States Patent Office 3,122,538
Patented Feb. 25, 1964

3,122,538
PYRIDO-OXAZINE DERIVATIVES AND A PROCESS
FOR THEIR PREPARATION
Niels Clauson-Kaas, Copenhagen, Denmark, and Rolf
Denss, Basel, Franz H. Ostermayer, Riehen, near Basel,
and Ernst F. Renk, Basel, Switzerland, assignors to
Geigy Chemical Corporation, Ardsley, N.Y., a corporation of Delaware
No Drawing. Filed Nov. 9, 1962, Ser. No. 236,712
Claims priority, application Switzerland Nov. 14, 1961
10 Claims. (Cl. 260—244)

The present invention concerns new oxazine derivatives which have valuable pharmacological properties, as well as processes for the production of the same.

It has surprisingly been found that oxazine derivatives of the formula

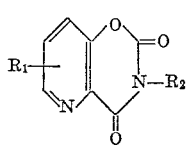

wherein $R_1$ represents hydrogen or a lower alkyl radical, preferably with 1 to 3 carbon atoms, and $R_2$ represents
(a) hydrogen or
(b) a monovalent aliphatic or cycloaliphatic radical having at most a total of 12 carbon atoms which can also contain halogen, oxygen atoms in the form of hydroxyl, ether, carbonyl, carboxyl or alkoxycarbonyl groups, or sulphur atoms in the form of alkylthio groups, or nitrogen atoms in the form of nitrile, amide or tertiary amino groups, or it represents
(c) a phenyl, phenylalkyl, phenoxyalkyl, phenylalkenyl or heterocycloylalkyl radical, which radicals have at most a total of 12 carbon atoms, and, if desired, the aromatic carbocyclic and heterocyclic rings of $R_2$ can be substituted by at most three substituents selected from the group consisting of alkyl groups, trifluoromethyl groups, or alkoxy groups, with the proviso that the total number of carbon atoms of $R_2$ does not exceed 12, halogen atoms, hydroxyl groups, nitro groups and/or amino groups, and, in the aliphatic radical of these substituents, a methylene group can be replaced by a carbonyl group, or finally, it represents
(d) an N-alkyl-N-phenyl-carbamoylalkyl or a piperidino carbonylalkyl group, each of which has a total of maximally 12 carbon atoms, have valuable pharmacological properties, in particular analgetic, antipyretic, antiphlogistic, muscle-relaxing and also bacteriostatic and fungistatic activity. In addition they have an inhibitory action on monoaminooxidase. They are also valuable intermediate products, e.g. for the production of other pharmacologically active substances and also of pest control agents.

To produce the compounds defined above, a compound of the formula

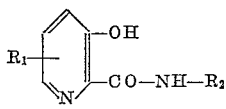

wherein $R_1$ and $R_2$ have the meanings given above, is reacted under condensing conditions with a reactive carbonic acid derivative, in particular with a compound of the general Formula III

wherein X and Y independently of each other represent hydrocarbon radicals each bound by way of an oxygen atom, in particular lower alkoxy radicals or phenoxy radicals, halogen atoms, in particular chlorine, the radical $-NHR_2$ or the radical

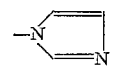

The following are particularly mentioned as compounds to be used: phosgene, chlorocarbonic acid methyl ester, chlorocarbonic acid ethyl ester, chlorocarbonic acid phenyl ester, chlorocarbonic acid benzyl ester, and N,N'-carbonyl-diimidazole.

Condensation is achieved in these cases by performing the reaction in the presence of an acid-binding agent, for example in aqueous alkali, in anhydrous medium using sodium hydride or lithium amide, or using an organic base such as, e.g. pyridine, quinoline, quinaldine, sym. collidine, or 2,6-lutidine as condensation agents.

A particular method of performing this process consists in reacting a compound of the general Formula II defined above in which $R_1$ and $R_2$ have the above meanings, with a chlorocarbonic acid derivative of the formula

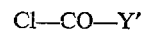    IIIa wherein Y′ represents chlorine or a methoxy, ethoxy or phenoxy radical. This reaction is performed in aqueous alkali or using organic bases capable of participating in the reaction as condensation agents, particularly quinoline, quinaldine, symmetrical collidine or 2,6-lutidine, in the presence or absence of a solvent inert in the said reaction, or of an excess of the aforesaid organic base-condensation agent. If desired, a metal salt, preferably an alkali metal salt of a compound so obtained of the general Formula I wherein $R_2$ represents hydrogen, is reacted with a reactive ester of a compound of the formula

    IV wherein $R_2′$ represents a radical as defined under $R_2$ exclusive of unsubstituted or substituted phenyl radical. This reaction is advantageously performed at temperatures between 0° and 200° C.

Suitable starting material of the general Formula IV are the following classes of compounds having a non-aromatically bound halogen atom: alkyl halides, alkenyl and alkinyl halides, alkoxyalkyl halides, dialkylaminoalkyl halides, polymethyleneiminoalkyl halides, morpholino alkyl halides, halogen fatty acid esters, halogen fatty acid amines which may be N-substituted, with aralkyl halides and phenacyl halides having an aromatic ring which may be substituted by halogen, alkyl, alkoxy, or nitro groups, also, e.g. aryl sulphonic acid and alkane sulphonic acid alkyl esters and dialkyl sulphates, the total number of carbon atoms of all these compounds not exceeding 12.

The reaction of these halides or other reactive esters with metal salts of compounds of the general Formula I wherein $R_2$ is hydrogen, for example with sodium, potassium or silver salts of such compounds, is performed preferably in a suitable inert organic solvent, e.g. in dimethyl formamide or dimethyl sulphoxide, at room temperature.

Another method of performing the process mentioned above consists in treating approximately at room temperature a compound of the general Formula II with a chlorocarbonic acid derivative of the general Formula IIIa in acetonitrile as solvent and using symmetrical collidine or 2,6-lutidine as condensation agent.

Best results are obtained by a suitable choice of the condensing conditions in the reactions described above, depending largely on the exact nature of the radicals X, Y and Y'. Thus, when these are hydrocarbon radicals bound by an oxygen atom, e.g. alkoxy radicals, or the radicals —$NH_2$ or NH—$R_2$, the condensation is completed preferably by heating in the presence or absence of a solvent or diluent until a compound XH, YH or Y'H is liberated. When at least one of the radicals X, Y and Y' is a halogen atom, the condensation is performed preferably by heating in organic bases. The exact selection of the optimal condensing conditions is best determined empirically, this being well within the purview of the skilled in the art.

In the compounds of the general Formula I and the corresponding starting materials, $R_1$ is, for example, hydrogen or a lower alkyl radical, e.g. the methyl, ethyl, n-propyl, isopropyl, or butyl radical.

Apart from hydrogen, $R_2$ is preferably one of the following radicals: alkyl radicals such as, e.g. methyl, ethyl, n-propyl, isopropyl, n-butyl, isobutyl, sec. butyl, tert. butyl, amyl radicals etc. up to dodecyl radicals; alkenyl radicals preferably with 3 to 4 carbon atoms such as allyl or crotyl; alkinyl radicals such as, e.g. the propargyl radical; cycloalkyl radicals such as, e.g. cyclopentyl, cyclohexyl, or cycloheptyl radicals; other aliphatic radicals in which a methylene group is replaced by a carbonyl group such as, e.g. acetonyl or β-acetyl ethyl radicals; also radicals containing halogen such as, e.g. β-chloroethyl or β-bromoethyl radicals; also hydroxyalkyl radicals such as, e.g. β-hydroxyethyl, β-hydroxypropyl, γ-hydroxypropyl radicals; carboxyalkyl (-alkylene-COOH) and carbalkoxyalkyl (alkoxy-carbonyl-alkylene) radicals such as, e.g. carboxymethyl, α- and β-carboxyethyl, carbethoxymethyl (=ethoxycarbonyl-methyl), α- and β-carbethoxyethyl and γ-carbethoxypropyl radicals; alkoxyalkyl radicals such as, e.g. β-methoxyethyl and α- and β-ethoxyethyl radicals or the corresponding thio compounds such as, e.g. the β-methylthioethyl radical; cyanomethyl, β-cyanoethyl, γ-dimethylaminopropyl and N,N-dimethylcarbamoylmethyl radicals. Of radicals $R_2$ which contain an aromatic ring, the following are mentioned: phenyl or benzyl radicals which can be substituted, if desired, by 1 to 3 halogen atoms, lower alkyl or alkoxy radicals or the trifluoromethyl group, such as, e.g. an o-, m- or p-chlorophenyl radical, a 3,4-dichlorophenyl radical, an o-, m- or p-methyl-phenyl radical, an o-, m- or p-methoxyphenyl radical, an o-, m- or p-chlorobenzyl radical, a 2,4- or 3,4-dichlorobenzyl radical, and o-, m- or p-fluorobenzyl radical, an m-trifluoromethylbenzyl radical, and o-, m- or p-methoxybenzyl radical, a 3,4-dimethoxy- or 3,4,5-trimethoxy-benzyl radical, an o-, m- or p-nitrobenzyl radical, an o-, m- or p-aminobenzyl radical, an o-, m- or p-hydroxybenzyl radical, also a benzoylmethyl radical the benzene ring of which can be substituted by one or two nitro, amino, methyl or hydroxyl groups, also an α- or β-benzoylethyl radical, a β-phenoxyethyl or a γ-phenoxypropyl radical, a β-phenylethyl or a γ-phenylpropyl radical the benzene ring of which can be substituted by nitro or amino groups, a γ-phenyl-β-propenyl radical or an N-phenyl-N-methyl-carbamoylmethyl radical. The term "heterocycloylalkyl" as used above in defining $R_2$ means: a 2-thenyl or a 2-furylmethyl radical, the rings of which can also be substituted by a nitro group, also a piperidino alkyl radical such as the piperidino-methyl and the β-piperidino-ethyl radicals, $N^4$-substituted piperazinyl-(1)-alkyl radicals such as, e.g. an $N^4$-methyl-piperazinyl-(1)-methyl radical, and pyridyl alkyl radicals such as, e.g. 2- and 4-pyridyl methyl radicals or β-(2- and 4-pyridyl)-ethyl radicals.

The starting materials of the general Formula II are obtained, for example, starting from unsubstituted or, optionally, substituted 3-hydroxy-pyridine-2-carboxylic acids, by known methods.

As typical representatives of compounds of the general Formula III are mentioned: diethyl carbonate, dimethyl carbonate, diphenyl carbonate, chloroformic acid methyl ester, chloroformic acid ethyl ester, chloroformic acid phenyl ester, phosgene, urea or ureas substituted as defined for $R_2$ supra.

A variation of the first method described for the production of compounds of the general Formula I consists in isolating the compounds which occur as intermediates of the general formulas

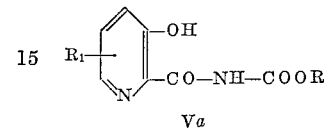 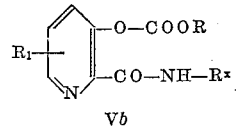

Va   Vb wherein R represents a lower alkyl radical or the benzyl radical and $R^x$ represents a lower alkyl radical or the phenyl radical, and converting them by heating, possibly in an inert solvent, into the correspondingly substituted compounds of general Formula I.

In a modification of the process for the production of new oxazine derivatives of the general Formula I, either a compound of the general formula

VI wherein R' represents a lower alkyl radical, particularly the methyl radical, is reacted directly in a basically reacting medium with an isocyanate of the general formula

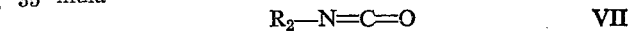

$$R_2\text{—N}=\text{C}=\text{O} \qquad \text{VII}$$

wherein $R_2$ has the meaning given above, to form a compound of general Formula I, or if desired, an intermediate product occurring in this reaction of the general formula

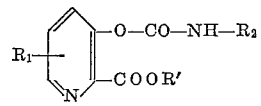

VIII wherein $R_1$, $R_2$ and R' have the meanings given above, is converted by heating into a compound of the general Formula I.

A particular method of performing this process consists in using an isocyanate of the general formula

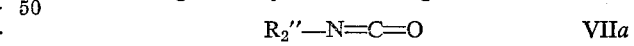

$$R_2''\text{—N}=\text{C}=\text{O} \qquad \text{VII}a$$

wherein $R_2''$ represents a lower alkyl radical or a phenyl radical which may be substituted by halogen atoms or lower alkyl radicals, and performing the reaction in the presence of triethylamine as base.

Instead of producing direct compounds, the radical $R_2$ of which is not hydrogen, by one of the previous processes, such compounds can also be produced by subsequent introduction of the radical $R_2$ into corresponding compounds having hydrogen as $R_2$. This is done by reacting such a compound with a compound of the general formula

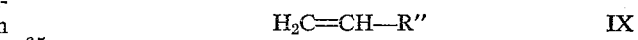

$$H_2C=CH\text{—}R'' \qquad \text{IX}$$

wherein R'' represents the cyanide group, and alkoxycarbonyl radical, the acetyl, benzoyl, 2-pyridyl or 4-pyridyl radical, the reaction possibly being performed with the addition of a catalyst.

Suitable starting materials of the general Formula IX are, for example, acrylonitrile, acrylic acid esters such as acrylic acid methyl or ethyl ester, methyl vinyl ketone, phenyl vinyl ketone and vinyl pyridines. The addition is made in the warm, in the presence or absence of a catalyst, an excess of the compound of the general Formula IX or a higher boiling inert organic solvent, for example, being used as reaction medium.

Finally compounds of the general Formula I in which the radical $R_2$ contains a nitrogen atom in the form of a tertiary amino group are obtained if a compound of the general Formula I in which $R_2$ is hydrogen, is reacted with formaldehyde and a secondary amine of the formula

X wherein $R_3$ and $R_4$ are each an alkyl radical having at most 3 carbon atoms, or, together with the nitrogen atom, they represent a saturated five to seven-membered heterocycle.

Suitable compounds of the general Formula X are, e.g.: dimethylamine, diethylamine, methylethylamine, pyrrolidine, piperidine, hexamethyleneimine, N-methyl piperazine, morpholine, etc. The condensation is preferably performed in an anhydrous medium, e.g. in dioxan, if necessary with slight heating. The products obtained by this process correspond to formula

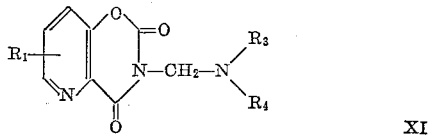
XI which is embraced by Formula I. In this formula $R_1$, $R_3$ and $R_4$ have the meanings given above.

The following non-limitative examples further illustrate the process according to the invention. The temperatures are given in degrees centigrade.

EXAMPLE 1

1.38 g. of 3-hydroxy-picolinic acid amide and 2.5 ml. of quinoline are mixed in a distillation flask and cooled to 0°. 1.92 ml. of chloroformic acid ethyl ester are added all at once and the mixture is heated to 40–50° while stirring. The temperature rises without external heating quickly to about 100°, the mixture becoming a homogeneous pale brown oil. It is heated for 3 minutes at 200° whereupon it first turns green and then black. The mixture is cooled to 150° and dissolved in 30 ml. of ethanol which is added all at one. The dark ethanolic solution is cooled to 0° and a mixture, cooled to −10°, of 10 ml. of concentrated hydrochloric acid and 10 ml. of water is added all at once. After cooling, and, if necessary, scraping the wall of the vessel to facilitate crystallization, the clear solution obtained, the crude 3,4-dihydro-2,4-dioxo-2H-pyrido[2,3-e][1,3]oxazine hydrochloride crystallises out as a blue-green powder. After 15 minutes it is filtered off, washed twice with 5 ml. of ethanol each time and dried. The base can be set free by one of the two following methods:

The crude hydrochloride can be converted to the base by washing with water until the filtrate runs neutral. The base is also obtained by dissolving the hydrochloride in 2-N sodium hydroxide solution and then neutralising with dilute hydrochloric acid. The base can be recrystallised from boiling water, glacial acetic acid or pyridine, the thus crystallised base has a melting point of 280°. The compound gives no ferric chloride reaction (in methanol) and there is no precipitation from a solution of 2,4-dinitrophenyl hydrazine in 2 N hydrochloric acid.

The same compound, 3,4-dihydro-2,4-dioxo-2H-pyrido[2,3-e][1,3]oxazine can also be produced by the following ring closure reactions:

(a) 8.3 g. of 3-hydroxy picoline amide are suspended in 50 ml. of anhydrous acetonitrile and 8.2 g. of sym. collidine and the suspension is stirred with a solution of 11.0 g. of chloroformic acid phenyl ester in 20 ml. of acetonitrile for 20 hours at 40°. The suspension is concentrated in vacuo at 50°, 50 ml. of water are added to the residue and undissolved substance is filtered off. The filtration residue is washed with 50 ml. of water and 20 ml. each of isopropanol and acetone. The 3,4-dihydro-2,4-dioxo-2H-pyrido[2,3-e][1,3]oxazine so formed melts at 276–278°; yield 81%. A colourless product which melts at 280° is obtained by recrystallisation from glacial acetic acid with the addition of charcoal.

(b) 3.3 g. of N,N'-carbonyl-diimidazole and 1.4 g. of 3-hydroxy-picoline amide in 40 ml. of abs. tetrahydrofuran are refluxed for 16 hours. The reaction mixture is filtered and the filtrate is concentrated in vacuo. A grey residue remains which, after recrystallisation from dioxan with the addition of de-colourising carbon, melts at 280°. Yield 46%.

(c) 2.0 g. of N-carbomethoxy-3-hydroxy-picoline amide in 6 g. of diphenyl ether are heated for 10 minutes in a bath at 240–250°. The gas development which occurs at first is completed after 5 minutes. After cooling, 10 ml. of ether are added, it is filtered and the residue is thoroughly washed with ether. The 3,4-dihydro-2,4-dioxo-2H-pyridol[2,3-e][1,3]oxazine obtained melts at 278–280°. Yield 90%. Recrystallised from dioxan, the product melts at 280°.

(d) 0.42 g. of 3-benzyloxycarbonyloxy-picoline amide and 1.2 g. of diphenyl ether are heated for 10 minutes in a bath at 240–250°. After cooling, 3 ml. of ether are added. The 3,4-dihydro-2,4-dioxo-2H-pyrido[2,3-e][1,3]oxazine so obtained crystallises out; M.P. 280° (from dioxan); yield 40%.

EXAMPLE 2

A mixture of 150 mg. of symmetrical collidine, 200 mg. of chloroformic acid phenyl ester and 145 mg. of 3-hydroxy-6-methyl picoline amide in 3.0 ml. of abs. acetonitrile is stirred for 2 hours at 45°. After 30 minutes, a precipitate begins to form. The reaction mixture is concentrated in vacuo, the residue is distributed between water and ether, the aqueous phase is again extracted with ether and the ether solution is dried and concentrated. The oil which remains is heated for 1 minute at 120°, the crystals which separate are digested with ether and filtered off. The colourless crystals are 6-methyl-3,4-dihydro-2,4-dioxo-2H-pyrido[2,3-e][1,3]oxazine. 85 mg. are obtained; M.P. about 290°.

EXAMPLE 3

A mixture of 130 mg. of symmetrical collidine, 170 mg. of chloroformic acid phenyl ester and 160 mg. of 3-hydroxy-5-isopropyl picoline amide in 3.0 ml. of abs. acetonitrile is stirred for 3 hours at 45°. A precipitate begins to form after about 30 minutes. The reaction mixture is concentrated in vacuo, the residue is distributed between water and ether, the aqueous phase is again extracted with ether and the ether solutions are dried and concentrated. The oil which remains is heated for 1 minute at 120° and the crystals which separate are digested with ether and filtered off. The colourless crystals are 7-isopropyl-3,4-dihydro-2,4-dioxo-2H-pyrido[2,3-e][1,3] oxazine. 132 mg. are obtained; M.P. 210–212°.

EXAMPLE 4

30 g. of 3,4-dihydro-2,4-dioxo-2H-pyrido[2,3-e][1,3] oxazine are suspended in 80 ml. of dimethyl formamide. While stirring and cooling with ice, 8.9 g. of a 50% suspension of sodium hydride in mineral oil is so added in portions that the temperature does not exceed 15°. On completion of the gas development, a solution of 31.4 g. of benzyl bromide in 30 ml. of dimethyl formamide is added while still cooling. After standing for 1 to 2 days at room temperature, a sample diluted with five times its volume of water shows a pH of 7–8. When this has occurred, the whole reaction mixture is poured into 500 ml. of water. The 3-benzyl-3,4-dihydro-2,4-dioxo-2H-pyrido[2,3-e][1,3]oxazine which separates in crystalline form is filtered off under suction, washed with 50 ml. of water and 50 ml. of isopropanol and 50 ml. of ether and recrystallised from dioxane with the addition of charcoal. M.P. 174°; yield 75–80%.

EXAMPLE 5

The sodium salt is produced from 98.5 g. of 3,4-dihydro-2,4-dioxo-2H-pyrido[2,3-e][1,3]oxazine as described in Example 4 with 14.9 g. of sodium hydride suspension (50%) in 290 ml. of dimethyl formamide. A solution of 103 g. of phenacyl chloride in 14 ml. of dimethyl formamide is added to this solution while cooling with ice. The reaction mixture, after 6 hours, is poured into 2500 ml. of water. The pale beige crystals of 3-phenacyl-3,4-dihydro-2,4-dioxo-2H-pyrido[2,3-e][1,3]oxazine are filtered off under suction and recrystallised from dioxan with the addition of charcoal. M.P. 175°; yield 78%.

EXAMPLE 6

The sodium salt is produced from 30 g. of 3,4-dihydro-2,4-dioxo-2H-pyrido[2,3-e][1,3]oxazine as described in Example 4 with 9 g. of sodium hydride suspension (50%) in 70 ml. of dimethyl formamide. A solution of 31.2 g. of ethyl iodide in 20 ml. of dimethyl formamide is added while cooling with ice, the mixture is left for 16 hours at room temperature and then poured into 400 ml. of water. The precipitated crystals of 3-ethyl-3,4-dihydro-2,4-dioxo-2H-pyrido[2,3-e][1,3]oxazine are filtered off under suction, washed with 50 ml. of water and recrystallised from isopropanol. M.P. 150–151°; yield 30%.

EXAMPLE 7

16.4 g. of 3,4-dihydro-2,4-dioxo-2H-pyrido[2,3-e][1,3]oxazine, 27.6 g. of abs. potassium carbonate and 50 ml. of dimethyl formamide are stirred for 1 hour at room temperature in an atmosphere of nitrogen while excluding moisture. 22.4 g. of p-methylphenacyl bromide dissolved in 25 ml. of dimethyl formamide are then added whereupon a slightly exothermic reaction occurs. After 1 hour, the reaction mixture has turned dark brown. It is stirred for another 2 hours at room temperature and then poured into 500 g. of ice. The 3-(4'-methylphenacyl)-3,4-dihydro-2,4-dioxo-2H-pyrido[2,3-e][1,3]oxazine which precipitates melts, after recrystallisation from dioxan/ether at 202–203°.

Table

The following 3-substituted derivatives of 3,4-dihydro-2,4-dioxo-2H-pyrido[2,3-e][1,3]oxazine are obtained analogously to the methods described in Examples 4 to 7:

| 3-substituent | M.P. in °C. | Recrystallised from— | Yield in percent |
|---|---|---|---|
| methyl | 136 | isopropanol | [1] 54 |
| n-propyl | 130–131 | do | 52 |
| n-butyl | 115–116 | do | 60 |
| isoamyl | 98–100 | do | 58 |
| n-hexyl | 112–114 | do | 54 |
| n-dodecyl | 116–120 | acetone/chloroform | 59 |
| allyl | 117–122 | isopropanol | 57 |
| propargyl | 161 | acetone | 33 |
| benzyl | 174 | do | [2] 63 |
| o-Cl-benzyl | 157–158 | isopropanol/acetone | 44 |
| m-Cl-benzyl | 137 | isopropanol/dioxan | 59 |
| p-Cl-benzyl | 152–153 | isopropanol/acetone | 58 |
| m-F-benzyl | 150–152 | do | 39 |
| p-F-benzyl | 179–180 | acetone/dioxan | 44 |
| o-nitro-benzyl | 179 | dioxan | 53 |
| m-nitro-benzyl | 187–188 | acetone/dioxan | 23 |
| p-nitrobenzyl | 208–209 | dioxan | 60 |
| o-methyl-benzyl | 164–165 | do | 64 |
| m-methyl-benzyl | 124–126 | isopropanol | 31 |
| p-methyl-benzyl | 145 | do | 54 |
| 3',5'-dimethyl-benzyl | 175 | acetone/dioxan | 70 |
| p-tert. butyl-benzyl | 161–163 | isopropanol/acetone | 45 |
| m-Cl₃-benzyl | 172 | do | 45 |
| 2',4'-dichlorobenzyl | 155–157 | do | 53 |
| 3',4'-dichlorobenzyl | 178–179 | acetone/dioxan | 80 |
| o-methoxy-benzyl | 168–169 | dioxan | 30 |
| m-methoxy-benzyl | 111 | acetone/dioxan | 72 |
| p-methoxybenzyl | 168 | isopropanol | 74 |
| 3',4'-dimethoxy-benzyl | 172 | acetone/dioxan | 37 |
| 3',4',5'-trimethoxy-benzyl | 144–146 | do | 51 |
| 2'-phenylethyl | 215–216 | acetone/methanol | 87 |
| 2'-(p-nitrophenyl)-ethyl | 252 | dioxan | 50 |
| 3'-phenyl-propyl | 165–166 | isopropanol/dioxan | [3] 60 |
| 3'-(p-nitrophenyl)-propyl | 185–187 | do | 30 |
| 3'-phenyl-2'-propenyl (cinnamyl) | 215–216 | dioxan | 75 |
| 2'-furyl-methyl | 190 | isopropanol/dioxan | 64 |
| 2'-(5'-nitrofuryl)-methyl | 210–211 | dioxan | 50 |
| 2'-thenyl | 175 | acetone/isopropanol | 40 |
| 2'-pyridyl-methyl | 122 | do | 37 |
| 4'-pyridyl-methyl | 195 | isopropanol/dioxan | 42 |
| m-nitrobenzoyl-methyl | 250–252 | dioxan | 53 |
| p-nitrobenzoyl-methyl | 240–242 | dioxan/dimethylformamide | 48 |
| 2',4'-dimethylbenzoyl-methyl | 173–174 | dioxan | 52 |
| acetonyl | 135–136 | isopropanol | 63 |
| 2'-ethoxy-ethyl | 81 | do | 13 |
| 2'-phenoxy-ethyl | 125–126 | do | 27 |
| 3'-phenoxy-propyl | 122–123 | do | 47 |
| 2'-methylthio-ethyl | 158–159 | isopropanol/dioxan | 22 |
| carboethoxy-methyl | 152–153 | acetone | 51 |
| 1'-carboethoxy-ethyl | 122–123 | isopropanol | 49 |
| 3'-carboethoxy-propyl | 82 | isopropanol/acetone | 72 |
| 3'-methyl-phenacyl | 144–146 | dioxan/ether | 45 |
| 4'-methoxy-phenacyl | 198–200 | do | 55 |
| 3'-methoxy-phenacyl | 110–112 | do | 32 |
| 3',4'-dimethoxy-phenacyl | 204–205 | do | 65 |
| 3',4',5'-trimethoxy-phenacyl | 171–173 | do | 78 |
| 2'-chloro-phenacyl | 158–160 | do | 52 |
| 3'-chloro-phenacyl | 169–171 | do | 43 |
| 4'-chloro-phenacyl | 205–206 | do | 61 |
| 3',4'-dichloro-phenacyl | 190.5–192.5 | do | 45 |
| 3'-methyl-4'-chloro-phenacyl | 180–182 | do | 48 |
| N,N-dimethylcarbonyl-methyl | 163–164 | isopropanol/acetone | 13 |
| N-methyl-N-phenyl-carbonyl-methyl | 186–187 | isopropanol/dioxan | 26 |
| 2'-bromoethyl | 174 | dioxan | 69 |
| 2'-chloroethyl | 152–153 | isopropanol/acetone | 74 |
| cyanomethyl | 220–221 | dioxan | 49 |

[1] See also Example 8.
[2] See also Example 9.
[3] See also Example 10.

EXAMPLE 8

The sodium salt is produced from 16.4 g. of 3,4-dihydro-2,4-dioxo-2H-pyrido[2,3-e][1,3]oxazine, 4.8 g. of sodium hydride suspension (50%) and 40 ml. of dimethyl formamide as described in Example 4 and a solution of 13.2 g. of dimethyl sulphate in 20 ml. of dimethyl formamide is added. After 2 days, the mixture is poured into 200 ml. of water. 3-methyl-3,4-dihydro-2,4-dioxo-2H-pyrido[2,3-e][1,3]oxazine gradually crystallises out of the solution; M.P. 136° (from isopropanol); yield 45%.

EXAMPLE 9

(a) 0.9 ml. of chloroformic acid ethyl ester are added to a solution of 2.00 g. of 3-hydroxy-N-benzyl-picoline amide in 3.6 ml. of 2.5 N KOH and 30 ml. of water and the whole is shaken for 10 minutes. The oil which separates is taken up in methylene chloride/ether and the organic phase is extracted with 1 N KOH, washed with water, dried and concentrated. After recrystallising the residue from isopropanol, colourless crystals are obtained which melt at 174° (yield 8%).

(b) 3.6 g. of ammonium salt of 3,4-dihydro-2,4-dioxo-2H-pyrido[2,3-e][1,3]oxazine are suspended in 20 ml. of dimethyl formamide and 3.6 g. of benzyl bromide are added while stirring. A homogeneous solution is obtained after 20 minutes. This is left to stand for 16 hours and then poured into 100 ml. of water. 3-benzyl-3,4-dihydro-2,4-dioxo-2H-pyrido[2,3-e][1,3]oxazine precipitates in crystalline form; M.P. 174° (dioxan), yield 63%.

EXAMPLE 10

5.6 g. of 3-cinnamyl-3,4-dihydro-2,4-dioxo-2H-pyrido[2,3-e][1,3]oxazine (M.P. 215–216°, see table at end of Example 7), dissolved in 60 ml. of dioxan, are hydrogenated at room temperature and atmospheric pressure over 1 g. of palladium charcoal. After 1 mol of hydrogen has been taken up the hydrogenation ceases. 3-(3'-phenyl-propyl)-3,4-dihydro-2,4-dioxo-2H-pyrido[2,3-e]

[1,3]oxazine can be isolated by concentrating the solution. M.P. 165–166°; yield 77%.

EXAMPLE 11

The sodium salt from 32.8 g. of 3,4-dihydro-2,4-dioxo-2H-pyrido[2,3-e][1,3]oxazine is produced as described in Example 4 and is left to stand for 28 hours at room temperature with the sodium salt from 32.2 g. of 2-bromopropionic acid in 100 ml. of dimethyl formamide. The reaction mixture is poured into 300 ml. of water and treated with animal charcoal. After filtering, the pH of the solution is adjusted to 3 with 2 N hydrochloric acid. 3-(2'-carboxyethyl)-3,4-dihydro - 2,4 - dioxo - 2H - pyrido [2,3-e][1,3]oxazine precipitates in crystalline form and, recrystallised from (isopropanol/dioxan) it melts at 250°; yield 32%.

EXAMPLE 12

20 g. of p-nitrobenzyl-3,4-dihydro-2,4-dioxo-2H-pyrido [2,3-e][1,3]oxazine (M.P. 208–209°) in 1000 ml. of dioxan are hydrogenated at room temperature and atmospheric pressure over 8 g. of palladium charcoal. The hydrogenation ceases after 17 hours when 3 mols of hydrogen have been taken up. The catalyst is filtered off and the solution is greatly concentrated in vacuo. The crystals which separate are again dissolved by adding acetone and heating. After cooling, the 3-(p-aminobenzyl) - 3,4 - dihydro - 2,4 - dioxo-2H-pyrido[2,3-e][1,3] oxazine which crystallises out is filtered off under suction and dried under high vacuum. M.P. 200–202°; yield 78%.

The following amino derivatives are obtained in an analogous manner from the corresponding nitro derivatives:

3-(p-amino-β-phenyl)-3,4-dihydro-2,4-dioxo-2H-pyrido [2,3-e][1,3]oxazine; M.P. 180–186°, yield 37%.
3-(p-amino-phenacyl)-3,4-dihydro-2,4-dioxo-2H-pyrido [2,3-e][1,3]oxazine; M.P. 230°, yield 72%.

EXAMPLE 13

14 g. of 3-(p-aminobenzyl)-3,4-dihydro-2,4-dioxo-2H-pyrido[2,3-e][1,3]oxazine (see Example 12) are suspended in a mixture of 16 g. of concentrated sulphuric acid and 160 ml. of ice water. A solution of 4.2 g. of sodium nitrite in 24 ml. of water is added dropwise at −5° to 0° within 10 minutes while stirring whereupon the whole is stirred for 40 minutes at 20°. The still heterogeneous mixture is poured into 300 ml. of boiling water and boiled for 5 minutes. The tar formed is filtered off from the solution which is then poured into 200 ml. of ice water. The bright red crystals obtained are treated in dioxan with charcoal. On adding ether, the 3 - (p-hydroxybenzyl)-3,4-dihydro - 2,4-dioxo-2H - pyrido [2,3-e][1,3]oxazine gradually crystallises out; M.P. 215–218°, yield 37%.

3 - (p-hydroxy-phenacyl) - 3,4-dihydro - 2,4-dioxo -2 H pyrido[2,3-e][1,3]oxazine is obtained in an analogous manner. M.P. 235–240° (methanol), yield 13%.

EXAMPLE 14

The sodium salt is produced from 39.4 g. of 3,4-dihydro-2,4-dioxo-2H-pyrido[2,3-e][1,3]oxazine and 11.5 g. of sodium hydride suspension (50%) in 120 ml. of dimethyl sulphoxide (analogously to Example 4) and is left to stand for 16 hours at room temperature with a solution of 40.7 g. of chloroacetyl piperidine in 40 ml. of dimethyl sulphoxide. The reaction mixture is crystallised by cooling in ice. The crystals are filtered off under suction, washed with water and the 3-piperidino-carbonyl-methyl-3,4-dihydro-2,4-dioxo-2H-pyrido[2,3-e][1,3]oxazine is recrystallised from isopropanol/dioxan. M.P. 210°, yield 68%.

EXAMPLE 15

The sodium salt is produced from 16.4 g. of 3,4-dihydro-2,4-dioxo-2H-pyrido[2,3-e][1,3]oxazine, 4.8 g. of sodium hydride suspension (50%) and 40 ml. of dimethyl formamide as described in Example 4 and is left to stand for 7 days at room temperature with 16.6 g. of isoamyl methane sulphonate. After diluting with 300 ml. of water, the 3-isoamyl-3,4-dihydro-2,4-dioxo - 2H - pyrido[2,3-e] [1,3]oxazine gradually crystallises out. It is filtered off and recrystallised from acetone with the addition of animal charcoal; M.P. 98–100°, yield 25%.

EXAMPLE 16

The sodium salt is produced from 30 g. of 3,4-dihydro-2,4-dioxo-2H-pyrido[2,3-e][1,3]oxazine, 8.9 g. of sodium hydride and 80 ml. of dimethyl formamide as described in Example 4 and left to stand for 78 hours at room temperature with 50 g. of n-amyltoluene sulphonate in 25 ml. of dimethyl formamide. The 3-n-amyl-3,4-dihydro-2,4-dioxo-2H-pyrido[2,3-e][1,3]oxazine is precipitated in crystalline form by pouring into 500 ml. of water. It is recrystallized first from dioxan and then from isopropanol; M.P. 100–102°, yield 53%.

EXAMPLE 17

The sodium salt is produced from 16.4 g. of 3,4-dihydro-2,4-dioxo-2H-pyrido[2,3-e][1,3]oxazine and 4.8 g. of sodium hydride suspension (50%) in 40 ml. of dimethyl formamide as described in Example 4 and is left to stand for 5 days at room temperature with 22.2 g. of 2-piperidino-ethyl chloride. The reaction mixture is concentrated in vacuo and the residue is extracted warm with isopropanol. The isopropanol extract is treated with charcoal and, after filtering off the charcoal, is concentrated in vacuo. The residue is recrystallised from isopropanol with the addition of charcoal. In this way 3-(2'-piperidino-ethyl) - 3,4-dihydro-2,4-dioxo - 2H-pyrido[2,3-e][1,3] oxazine is obtained. M.P. 121–122°, yield 29%.

EXAMPLE 18

The di-(tertrahydropyranyl)-ether is produced from 18.6 g. of 4-chloroacetyl-pyrocatechol by the known process for protecting the OH groups, and the crude product, dissolved in 50 ml. of dimethyl formamide, is reacted with the sodium salt from 14.0 g. of 3,4-dihydro-2,4-dioxo-2H-pyrido[2,3-e][1,3]oxazine, 3.7 g. of sodium hydride suspension (50%) and 40 ml. of dimethyl formamide. After standing for 60 hours at room temperature, 250 ml. of water, 250 ml. of dioxan and 100 ml. of 1 N hydrochloric acid are added to the reaction mixture and the whole is left to stand for 16 hours. It is then neutralised with 100 ml. of 1 N sodium hydroxide solution. The precipitated crystals of 3-(3',4'-dihydroxybenzoylmethyl)-3,4-dihydro-2,4-dioxo-2H - pyrido[2,3-e] [1,3]oxazine are recrystallised from pyridine/ether. M.P. 280° (decomposition over 260°), yield 46%.

The following compounds are produced in an analogous way but are isolated by concentration in vacuo and extraction with isopropanol:
3-(3'-hydroxypropyl)-3,4-dihydro - 2,4-dioxo - 2H-pyrido [2,3-e][1,3]oxazine, M.P. 150–151°, yield 13%,
3-(2'-hydroxyethyl)-3,4-dihydro - 2,4-dioxo - 2H-pyrido [2,3-e][1,3]oxazine, M.P. 144-146°, yield 10%.

EXAMPLE 19

2.5 ml. of chloroformic acid ethyl ester are added to a suspension of 2.8 g. of 3-hydroxy-N-benzyl-picoline amide in 8.0 ml. of symmetrical collidine. The reaction mixture obtained is heated in an oil bath to 180° over 15 minutes and kept for 15 minutes at this temperature. Volatile parts are distilled off simultaneously. Water and ether are added to the cooled reaction product, it is filtered and the residue is recrystallised from isopropanol-methylenechloride with the addition of animal charcoal. 200 g. of colourless crystals are obtained. M.P. 174° (yield 64%).

The following compounds are produced by the same process

| 3-substituent | crystallised from | M.P. | yield % |
|---|---|---|---|
| CH₂CH₂CH(CH₃)₂ | isopropanol | 98–100° | 62 |
| cyclohexyl | isopropanol | 180° | 8 |

EXAMPLE 20

7.0 ml. of chloroformic acid methyl ester in 20 ml. of acetonitrile are added to 11.8 g. of N-methyl-3-hydroxypicoline amide in 50 ml. of abs. acetonitrile and 10.9 g. of symmetrical collidine, while stirring. The reaction mixture is at first homogeneous and then a precipitate gradually forms. The whole is stirred for 4–6 hours at 30–40° and then left to stand overnight. After concentrating in vacuo, a residue remains to which 150 ml. of water are added. 3-methyl-3,4-dihydro-2,4-dioxo-2H-pyrido[2,3-e][1,3]oxazine separates out on standing. M.P. 136° (from isopropanol), yield 50%.

The following 3-substituted derivatives of 3,4-dihydro-2,4-dioxo-2H-pyrido[2,3-e][1,3]oxazine are obtained in an analogous manner:

3-isoamyl: M.P. 98–100° (acetone), yield 31%,
3-benzyl: M.P. 174° (dioxan), yield 72%,
3-isobutyl: M.P. 131° (isopropanol/acetone), yield 49%,
3-(3'-dimethylaminopropyl): crystallises as hydrochloride from the concentration residue, M.P. 230° (from methanol), yield 46%.

EXAMPLE 21

3.1 g. of 3-hydroxy-picolinic acid methyl ester are dissolved in 30 ml. of abs. acetonitrile, 2.7 g. of symmetrical collidine are added and the whole is stirred for 20 hours at room temperature with a solution of 3.8 g. of N-benzylcarbamoyl chloride in 5 ml. of acetonitrile. After treating the solution with animal charcoal, it is concentrated in vacuo and the greasy residue is distributed between 5 ml. of water and 50 ml. of ether. The ether phase is removed, stirred with charcoal, filtered and concentrated. The oily residue is heated for half an hour at 150°, gas being developed. After cooling, crystals can be isolated by the addition of ether. Recrystallised from acetone and dioxan they melt at 174°. There is no depression of the melting point with 3-benzyl-3,4-dihydro-2,4-dioxo-2H-pyrido[2,3-e][1,3] oxazine (see Example 4).

EXAMPLE 22

8.0 ml. of chloroformic acid ethyl ester are added to a solution of 9.0 g. of 3-hydroxy-N-phenyl-picoline amide in 25 ml. of symmetrical collidine. Heat is generated and a precipitate forms. The reaction mixture is heated for 15 minutes in an oil bath at 155° and for 15 minutes at 175°, volatile parts being simultaneously distilled off. The reaction product is cooled, water and ether are added, it is filtered and the violet crystals which remain are recrystallised from dioxan with the addition of animal charcoal. Colourless crystals of 3-phenyl-3,4-dihydro-2,4-dioxo-2H-pyrido[2,3-e][1,3]oxazine are obtained. M.P. 279–281°, yield 44%.

The following are produced by the same process:

| 3-substituent | Crystallised from— | M. P., degrees | Yield, Percent |
|---|---|---|---|
| p-methyl-phenyl | dioxan | 253–254 | 61 |
| m-methyl-phenyl | ethanol | 163–165 | 20 |
| p-methoxy-phenyl | chloroform/isopropanol | 219–221 | 48 |
| m-chlorophenyl | do | 197–198 | 35 |

EXAMPLE 23

0.45 g. of 3-methoxycarbonyloxy-N-phenyl-picoline amide are heated for 10 minutes with 1.5 g. of diphenyl ether at 250°. After cooling, 5 ml. of ether are added. A dark crystalline precipitate is formed from which, after recrystallisation from dioxan (charcoal), colourless crystals are obtained (M.P. 279–281°). These crystals are identical with 3-phenyl-3,4-dihydro-2,4-dioxo-2H-pyrido[2,3-e][1,3]oxazine (see Example 22). Yield 26%.

EXAMPLE 24

A solution of 2.5 g. of 3-hydroxy-picolinic acid methyl ester, 1.8 g. of phenyl isocyanate and 6 drops of triethylamine in 20 ml. of abs. ether is left to stand for 30 hours at room temperature. The solvent is decanted off from the large crystals which precipitate and these are dissolved and recrystallised from methylene chloride/ether. Colourless crystals are obtained which melt at 72–74°. (Yield 58%).

On heating to about 200°, the product is converted with splitting off of methanol, into 3-phenyl-3,4-dihydro-2,4-dioxo-2H-pyrido[2,3-e][1,3]oxazine. M.P. 279–281°.

EXAMPLE 25

A solution of 2.5 g. of 3-hydroxy-picolinic acid methyl ester, 1.8 g. of phenyl isocyanate and 6 drops of triethylamine in 20 ml. of abs. acetonitrile is left to stand for 30 hours at room temperature. The reaction mixture is concentrated in vacuo and the crystalline residue is digested with ether, filtered and recrystallised from dioxan. Colourless crystals of 3-phenyl-3,4-dihydro-2,4-dioxo-2H-pyrido[2,3-e][1,3]oxazine are obtained which melt at 279–281° (yield 45%).

The following are produced by the same process:

| 3-substituent | Crystallised from— | M. P., degrees | Yield, Percent |
|---|---|---|---|
| p-methyl-phenyl | dioxan | 253–254 | 47 |
| p-chlorophenyl | do | 258–260 | 32 |
| 3,4-dichlorophenyl | do | 263–264 | 21 |

EXAMPLE 26

3.0 g. of 3-hydroxy-picolinic acid methyl ester dissolved in 10 ml. of abs. acetonitrile are left to stand for about 3 days at room temperature in a closed vessel with 4.0 g. of n-butyl isocyanate and 5 drops of triethylamine. After evaporating off the solvent in vacuo, a crystalline residue remains which melts at 111–112°. On recrystallising from a little methanol, the melting point of the 3-n-butyl-3,4-dihydro-2,4-dioxo-2H-pyrido[2,3-e][1,3]oxazine obtained rises to 115°. Yield 57% (see Example 7, table).

EXAMPLE 27

5.4 g. of 3,4-dihydro-2,4-dioxo-2H-pyrido[2,3-e[]1,3]-oxazine and 20 ml. of 2-vinyl pyridine are boiled under reflux until solution is attained and then the solution is kept for 1 hour at 150°. On cooling, the 3-[β-(2'-pyridylethyl)]-3,4-dihydro-2,4-dioxo-2H-pyrido[2,3-e][1,3]oxazine crystallises out; M.P. 176–177° (from methanol), yield 79%.

In an analogous manner but using 4-vinyl pyridine, 3-[β-(4'-pyridylethyl)]-3,4-dihydro-2,4-dioxo-2H-pyrido-[2,3-e][1,3]oxazine is obtained. M.P. 202–203° (from isopropanol/methanol), yield 84%.

EXAMPLE 28

8.2 g. of 3,4-dihydro-2,4-dioxo-2H-pyrido[2,3-e][1,3]oxazine, 20 ml. of acrylic acid ethyl ester, 5 ml. of dimethyl formamide, 0.01 g. of hydroquinone and 1.5 ml. of a 40% solution of benzyl-trimethyl-ammonium hydroxide (Triton B) in methanol are refluxed for 2 hours. After cooling, colourless needles of 3-(2'-carboethoxyethyl)-3,4-dihydro-2,4-dioxo-2H-pyrido[2,3-e]-[1,3]oxazine gradually crystallise out. M.P. 146° (from isopropanol), yield 40%.

The following are obtained in an analogous manner: 3-(2'-cyanoethyl) derivative from acrylonitrile, M.P. 136–137° (from dioxan), yield 62%, 3-(2'-acetylethyl) derivative from methyl vinyl ketone, M.P. 164–165°

(from dioxan), yield 56%, 3-(2'-benzoyl-ethyl) derivative from phenyl vinyl ketone, M.P. 161–162° (from acetone/dioxan), yield 67%.

EXAMPLE 29

100 ml. of a dioxan solution containing 3–4 g. of formaldehyde and 5.0 g. of N-methyl piperazine are left to stand for 16 hours at 25°. A solution of 8.2 g. of 3,4-dihydro-2,4-dioxo-2H-pyrido[2,3-e][1,3]oxazine in 200 ml. of dioxan is added and the whole is again left to stand for 20 hours. After concentrating in vacuo, a whitish residue of 3-[N-(N'-methyl)-piperazinomethyl]-3,4-dihydro - 2,4 - dioxo - 2H - pyrido[2,3 - e][1,3]oxazine remains which is washed with 50 ml. of ether. It is already sufficiently pure for analysis. M.P. 150–152°, yield 72%.

The 3-(N-piperidinomethyl) derivative is produced in an analogous manenr; M.P. 145°–147° (from dioxan/ether), yield 60%.

EXAMPLE 30

2.0 g. of 3-hydroxy picolinic acid anilide are dissolved in 20 ml. of abs. acetonitrile, 1.5 g. of symmetrical collidine and 1.0 ml. of chloroformic acid methyl ester are added and the whole is stirred for 21 hours at room temperature. The reaction mixture is concentrated under reduced pressure and the residue is rubbed with 30 ml. of water. The rubbery, water-insoluble product is rubbed with a little ethanol and the crystals obtained are filtered off under suction. After crystallisation from acetone/dioxan, 3-methoxycarbonoyloxy picolinic acid anilide is obtained (M.P. 100°–104°, yield 51%).

What is claimed is:

1. A compound of the formula

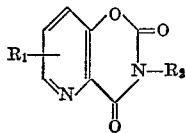

wherein $R_1$ is a member selected from the group consisting of hydrogen and lower alkyl having at most 3 carbon atoms, and $R_2$ is a member selected from the group consisting of hydrogen, alkyl having maximally 12 carbon atoms, alkenyl with 3 to 4 carbon atoms, propargyl, cyclopentyl, cyclohexyl, cycloheptyl, acetonyl, β-acetylethyl, hydroxymethyl, carbethoxymethyl, β-hydroxyethyl, β-chloroethyl, β-bromoethyl, γ-hydroxypropyl, cyanomethyl, β-cyanoethyl, β-carboxyethyl, α-carbethoxyethyl, β-carbethoxyethyl, γ-carbethoxypropyl, β-ethoxyethyl, β-methylthioethyl, γ-dimethylaminopropyl, N,N-dimethylcarbamoylmethyl, phenyl, chlorophenyl, tolyl, anisyl, benzyl, methylbenzyl, dimethylbenzyl, tert. butylbenzyl, chlorobenzyl, dichlorobenzyl, fluorobenzyl, trifluoromethylbenzyl, methoxybenzyl, dimethoxybenzyl, trimethoxybenzyl, nitrobenzyl, aminobenzyl, hydroxybenzyl, benzoylmethyl, nitrobenzoylmethyl, aminobenzoylmethyl, methylbenzoylmethyl, dimethylbenzoylmethyl, hydroxybenzoylmethyl, dihydroxybenzoylmethyl, β-benzoylethyl, β-phenethyl, β-nitrophenethyl, β-aminophenethyl, β-phenoxyethyl, γ-phenylpropyl, γ-nitrophenylpropyl, γ-phenyl-β-propenyl, γ-phenoxypropyl, N-phenyl-N-methylcarbamoylmethyl, 2-thenyl, 2-furylmethyl, 2-(nitrofuryl)methyl, piperidinomethyl, β-piperidinoethyl, piperidinylmethyl, $N_4$-lower alkyl substituted 1-piperazinylmethyl, piperidinocarbonylmethyl, pyridylmethyl and β-pyridylethyl.

2. 3,4 - dihydro - 2,4 - dioxo - 2H - pyrido[2,3 - e][1,3]oxazine.

3. 6 - methyl - 3,4 - dihydro - 2,4 - dioxo - 2H - pyrido[2,3-e][1,3]oxazine.

4. 3 - benzyl - 3,4 - dihydro - 2,4 - dioxo - 2H - pyrido[2,3-e][1,3]oxazine.

5. 3 - phenacyl - 3,4 - dihydro - 2,4 - dioxo - 2H - pyrido[2,3-e][1,3]oxazine.

6. 3 - (4' - methylphenacyl) - 3,4 - dihydro - 2,4 - dioxo-2H-pyrido[2,3-e][1,3]oxazine.

7. 3 - methyl - 3,4 - dihydro - 2,4 - dioxo - 2H - pyrido[2,3-e][1,3]oxazine.

8. 3 - (p - aminophenacyl) - 3,4 - dihydro - 2,4 -dioxo-2H-pyrido[2,3-e][1,3]oxazine.

9. 3 - (p - hydroxyphenacyl) - 3,4 - dihydro - 2,4 - dioxo-2H-pyrido[2,3-e][1,3]oxazine.

10. 3 - (3' - dimethylaminopropyl) - 3,4 - dihydro-2,4-dioxo-2H-pyrido-[2,3-e][1,3]-oxazine.

No references cited.

UNITED STATES PATENT OFFICE
CERTIFICATE OF CORRECTION

Patent No. 3,122,538　　　　　　　　　　　　　February 25, 1964

Niels Clauson-Kaas et al.

It is hereby certified that error appears in the above numbered patent requiring correction and that the said Letters Patent should read as corrected below.

Column 5, line 45, for "one" read -- once --; column 7, line 9, for "14 ml." read -- 140 ml. --; same column 7, in the Table, line 23 thereof, for "m-Cl$_3$-benzyl" read -- m-CF$_3$-benzyl --; column 13, line 18, for "manenr" read -- manner --.

Signed and sealed this 14th day of July 1964.

(SEAL)

Attest:

ESTON G. JOHNSON
Attesting Officer

EDWARD J. BRENNER
Commissioner of Patents